(12) United States Patent
Huang et al.

(10) Patent No.: US 8,531,397 B2
(45) Date of Patent: Sep. 10, 2013

(54) METHOD OF CALIBRATING POSITION OFFSET OF CURSOR

(75) Inventors: Kai-Fen Huang, Banqiao (TW); Jr-Wei Lian, Banqiao (TW)

(73) Assignee: Tenx Technology Inc., Taipei County (TW)

( * ) Notice: Subject to any disclaimer, the term of this patent is extended or adjusted under 35 U.S.C. 154(b) by 869 days.

(21) Appl. No.: 12/712,955

(22) Filed: Feb. 25, 2010

(65) Prior Publication Data

US 2010/0309124 A1 Dec. 9, 2010

(30) Foreign Application Priority Data

Jun. 9, 2009 (TW) .............................. 98119139 A (51) Int. Cl.
 *G06F 3/038* (2013.01)
(52) U.S. Cl.
 USPC ........... 345/158; 345/157; 345/161; 345/163; 345/167; 345/180; 715/656; 348/734
(58) Field of Classification Search
 USPC ................. 345/180, 156–158, 161, 163, 167; 348/734; 715/856
 See application file for complete search history.

(56) References Cited

U.S. PATENT DOCUMENTS

| 2004/0095317 | A1* | 5/2004 | Zhang et al. | 345/158 |
| 2004/0266528 | A1* | 12/2004 | Wang | 463/37 |
| 2005/0104849 | A1* | 5/2005 | Hoile | 345/157 |
| 2006/0152489 | A1* | 7/2006 | Sweetser et al. | 345/158 |
| 2008/0268896 | A1* | 10/2008 | Langlois et al. | 455/550.1 |

* cited by examiner

*Primary Examiner* — Lun-Yi Lao
*Assistant Examiner* — Olga Merkoulova
(74) *Attorney, Agent, or Firm* — Li & Cai Intellectual Property (USA) Office (57) ABSTRACT

The present invention provides a method of calibrating a position offset of a cursor on a screen such that, when a pointing device has already been moved to a position beyond the screen boundary, virtual coordinates of the pointing device are calculated and recorded to track the physical positions of the pointing device efficiently, and then the position offset between the pointing device and the cursor on the screen is compensated and corrected, so as for the user to greatly reduce the hassle of manually operating the pointing device for controlling cursor movement and thereby operate the cursor on the screen at will.

15 Claims, 4 Drawing Sheets

METHOD OF CALIBRATING POSITION OFFSET OF CURSOR

BACKGROUND OF THE INVENTION

1. Technical Field

The invention relates to a method of calibrating a position offset of a cursor, and more particularly to a method for compensating the position offset of a cursor according to calculating boundary offset value of the cursor on a screen.

2. Description of Related Art

Owing to evolution of input devices for use with computers, a mouse is an input pointing device almost indispensable to computers nowadays. A user quickly moves a cursor on a screen of a display device connected with a computer to any icons or options displayed thereon, by moving a mouse. A plenty of input pointing devices such as wireless pointing devices and methods such as eye movements have hitherto been developed for controlling cursor movement.

Figure 1:
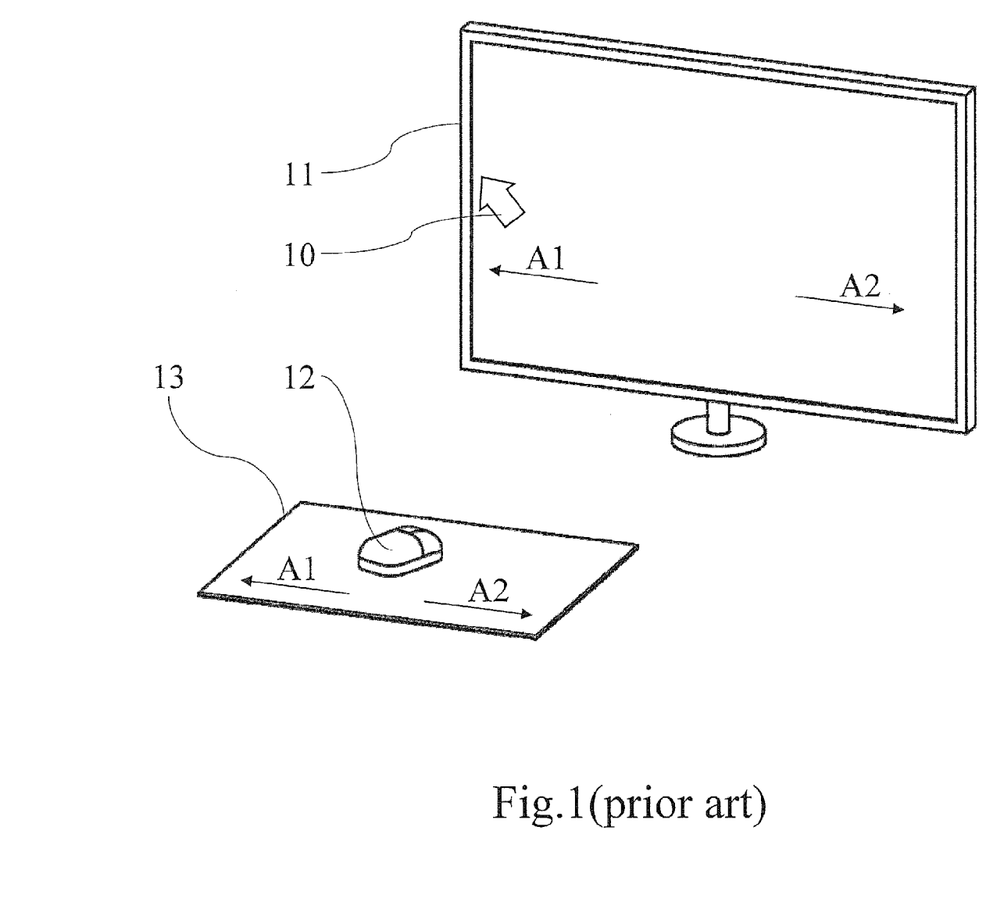
FIG. 1 is a diagram schematically showing a conventional input pointing device and a cursor position on a screen display coordination.

However, a problem encountered in controlling cursor movement with whatever input pointing devices remains unsolved. As time passes, a position offset between an input pointing device and a cursor increases with errors and thus accumulates, thereby bringing inconvenience to a user. The problem is hereby exemplified by a mouse—an input pointing device in wide use. Referring to FIG. 1, a mouse 12 is moved by a user in the direction of A1, a cursor 10 will move in the direction of A1 in tandem with the input pointing device until the cursor 10 on the screen 11 reaches a boundary and stops. At this moment, if the mouse 12 is further moved in the direction of A1, the cursor 10 on the screen 11 will stay at the boundary of the screen 11. However, if the mouse 12 is moved in the direction of A2, the cursor 10 will instantly start to move in the direction of A2 in tandem with the cursor 10. After several instances of the aforesaid operation, the mouse 12 increasingly burdens the user's grip thereon, because the mouse 12 is moving away from the center of a mouse pad 13 gradually and inevitably. In an attempt to fix the problem, the user usually lifts the mouse 12 slightly, rests the mouse 12 on the mouse pad 13 again, and repositions the mouse 12 at the center of the mouse pad 13, before proceeding with operation of the cursor 10.

Likewise, the aforesaid problem occurs to other input pointing devices for controlling a cursor. For instance, in addition to general computer operation, wireless pointing devices, which are commercially available and in wide use, are applicable to interactive games developed for Wii or PS2 platforms. Hence, a wireless pointing device is an indispensable accessory for game players. As time passes, a game player is eventually confronted with a position offset between his/her wireless pointing device and the cursor on the screen. In an attempt to eliminate the position offset, the game player usually takes a break and, during the break, realigns the wireless pointing device with the cursor on the screen before proceeding with the games. Therefore, a position offset has a negative impact on input pointing devices regarding ease of use of the input pointing devices and the quality of the games being played.

Hence, it is imperative to resolve the problem of a position offset between a pointing device and a cursor on a screen, so as for users to operate whatever pointing devices smoothly without the hassle of lifting a mouse, realigning the mouse, or repositioning a wireless pointing device during the user's operation.

SUMMARY OF THE INVENTION

To solve the problems and the drawbacks encountered in the prior art, the present invention provides a method of calibrating a position offset of a cursor on a screen, and the method comprises the steps of:

(1) providing boundary positions in a coordinate system and resetting a pair of boundary offset values, where the boundary positions in the coordinate system are defined by resolution of the screen, the boundary positions indicate an x-axis boundary position Xb and a y-axis boundary position Yb, and the pair of boundary offset values indicate an x-axis boundary offset value $\Delta x$ and a y-axis boundary offset value $\Delta y$;

(2) confirming whether or not the resolution of the screen has changed so as to update the x-axis boundary position Xb and the y-axis boundary position Yb in the coordinate system;

(3) determining a pair of displacement values representative of an x-axis displacement value Xd and a y-axis displacement value Yd of the cursor upon receipt of an inertial sensing signal from an inertial sensor;

(4) calculating a new pair of virtual coordinates (x', y') of the cursor according to the x-axis displacement value Xd and the y-axis displacement value Yd,
where x'=current x-axis virtual position of the cursor+Xd, and
y'=current y-axis virtual position of the cursor+Yd;

(5) calculating a new pair of boundary offset values of the cursor based on the new pair of virtual coordinates (x', y') of the cursor so as to:
  (i) reset the x-axis boundary offset value $\Delta x$ if the cursor falls within the boundary positions (Xb, Yb) in the coordinate system after the cursor moves the x-axis displacement value Xd;
  (ii) calculate and record the x-axis boundary offset value $\Delta x$ if the cursor falls outside the boundary positions (Xb, Yb) in the coordinate system after the cursor moves the x-axis displacement value Xd, where $\Delta x = x' - Xb$;
  (iii) reset the y-axis boundary offset value $\Delta y$ if the cursor falls within the boundary positions (Xb, Yb) in the coordinate system after the cursor moves the y-axis displacement value Yd; and
  (iv) calculate and record the y-axis boundary offset value $\Delta y$ if the cursor falls outside the boundary positions (Xb, Yb) in the coordinate system after the cursor moves the y-axis displacement value Yd, where $\Delta y = y' - Yb$;

(6) outputting the cursor's movement on the screen according to the following criteria:
  (i) given $\Delta x = \Delta y = 0$, converting the new pair of virtual coordinates (x', y') of the cursor into real coordinates (x, y), where x=x', y=y', and moving the cursor to a new position of the screen corresponding to the real coordinates (x, y);
  (ii) given $\Delta x \neq 0$ and $\Delta y = 0$, converting the new pair of virtual coordinates (x', y') of the cursor into real coordinates (x, y), where x=Xb, y=y', and moving the cursor to a new position of the screen corresponding to the real coordinates (x, y);
  (iii) given $\Delta x = 0$ and $\Delta y \neq 0$, converting the new pair of virtual coordinates (x', y') of the cursor into real coordinates (x, y), where x=x', y=Yb, and moving the cursor to a new position of the screen corresponding to the real coordinates (x, y); and
  (iv) given $\Delta x \neq 0$ and $\Delta y \neq 0$, moving the cursor to a new position of the screen corresponding to the real coordinates (x, y), where x=Xb, y=Yb;

(7) examining the resolution of the screen, where alteration of the resolution of the screen is allowable when both the x-axis boundary offset value $\Delta x$ and the y-axis boundary offset value $\Delta y$ equal zero; and (8) ending the method, or returning to the step (2).

Hence, it is a primary objective of the present invention to provide a method of calibrating a position offset of a cursor on the screen such that, when a pointing device has already been moved to a position beyond the screen boundary, virtual coordinates of the pointing device are calculated and recorded to track the physical positions of the pointing device efficiently, and then the position offset between the pointing device and the cursor on the screen is compensated and corrected, so as for the user to greatly reduce the hassle of manually operating the pointing device for controlling cursor movement and thereby operate the cursor on the screen at will.

It is a secondary objective of the present invention to provide a method of calibrating a position offset of a cursor on the screen such that, upon the entry of the cursor into a coordinate system on the screen, a user can change a resolution of the screen in order to have a new x-axis boundary position and a new y-axis boundary position in the coordinate system on the screen, and the user can initialize the cursor position so as for the cursor to be positioned at a preset position on the screen with a view to compensating and correcting a position or angular offset between a pointing device and the cursor on the screen.

It is a further objective of the present invention to provide a method of calibrating a position offset of a cursor such that a position offset between a pointing device and the cursor on a screen is compensated and corrected by calculating and recording a plurality of boundary offset values $\Delta x$, $\Delta y$, thereby allowing a user to operate the cursor on the screen at will without calibrating the pointing device manually and frequently.

Besides, the present invention provides another method of calibrating a position offset of a cursor on a screen, and the method comprises the steps of:

(1) providing boundary positions in a coordinate system and resetting a pair of boundary offset values, where the boundary positions in the coordinate system are defined by resolution of the screen, the boundary positions indicating an x-axis boundary position Xb and a y-axis boundary position Yb, and the pair of boundary offset values indicating an x-axis boundary offset value $\Delta x$ and a y-axis boundary offset value $\Delta y$;

(2) determining a pair of displacement values representative of an x-axis displacement value Xd and a y-axis displacement value Yd of the cursor upon receipt of an inertial sensing signal from an inertial sensor;

(3) calculating a new pair of virtual coordinates (x', y') of the cursor according to the x-axis displacement value Xd and the y-axis displacement value Yd, where x'=current x-axis virtual position of the cursor+Xd, and y'=current y-axis virtual position of the cursor+Yd;

(4) calculating a new pair of boundary offset values of the cursor based on the new pair of virtual coordinates (x', y') of the cursor so as to:
 (i) reset the x-axis boundary offset value $\Delta x$ if the cursor falls within the boundary position (Xb,Yb) in the coordinate system after moving the x-axis displacement value Xd;
 (ii) calculate and record the x-axis boundary offset value $\Delta x$ if the cursor falls outside the boundary positions (Xb,Yb) in the coordinate system after moving the x-axis displacement value Xd, where $\Delta x = x' - Xb$;
 (iii) reset the y-axis boundary offset value $\Delta y$ if the cursor falls within the boundary positions (Xb,Yb) in the coordinate system after moving the y-axis displacement value Yd; and
 (iv) calculate and record the y-axis boundary offset value $\Delta y$ if the cursor falls outside the boundary positions (Xb,Yb) in the coordinate system after moving the y-axis displacement value Yd, where $\Delta y = y' - Yb$;

(5) outputting cursor movement on the screen according to criteria as follows:
 (i) given $\Delta x = \Delta y = 0$, converting the new pair of virtual coordinates (x', y') of the cursor into real coordinates (x, y), where x=x', y=y', and moving the cursor to a new position of the screen corresponding to the real coordinates (x, y);
 (ii) given $\Delta x \neq 0$ and $\Delta y = 0$, converting the new pair of virtual coordinates (x', y') of the cursor into real coordinates (x, y), where x=Xb, y=y', and moving the cursor to a new position of the screen corresponding to the real coordinates (x, y);
 (iii) given $\Delta x = 0$ and $\Delta y \neq 0$, converting the new pair of virtual coordinates (x', y') of the cursor into real coordinates (x, y), where x=x', y=Yb, and moving the cursor to a new position of the screen corresponding to the real coordinates (x, y); and
 (iv) given $\Delta x \neq 0$ and $\Delta y \neq 0$, moving the cursor' to a new position of the screen corresponding to the real coordinates (x, y), where x=Xb, y=Yb;

(6) ending the method, or returning to step (2).

Hence, it is a primary objective of the present invention to provide a method of calibrating a position offset of a cursor on the screen such that, when a pointing device has already been moved to a position beyond the screen boundary, virtual coordinates of the pointing device are calculated and recorded to track the physical positions of the pointing device efficiently, and then the position offset between the pointing device and the cursor on the screen is compensated and corrected, so as for the user to greatly reduce the hassle of manually operating the pointing device for controlling cursor movement and thereby operate the cursor on the screen at will.

It is a secondary objective of the present invention to provide a method of calibrating a position offset of a cursor such that a position offset between a pointing device and the cursor on a screen is compensated and corrected by calculating and recording a plurality of boundary offset values $\Delta x$, $\Delta y$, thereby allowing a user to operate the cursor on the screen at will without calibrating the pointing device manually and frequently.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE INVENTION

A method of calibrating a position offset of a cursor thereof has been disclosed in the invention; where the principles of signal transmission between a pointing device and cursor may be easily comprehended by those of ordinary skill in relevant technical fields, and thus will not be further described hereafter. Meanwhile, it should be noted that the drawings referred to in the following paragraphs only serve the purpose of illustrating structures related to the characteristics of the disclosure, and are not necessarily drawn according to actual scales and sizes of the disclosed objects. Some particular embodiments of the invention will be described in detail for purpose of illustration, and one of ordinary skill in the art can easily understand the advantages and efficacy of the present invention through the disclosure of the specification. It is to be understood that alternative embodiments may be possible for the implement and application of the present invention while numerous variations will be possible to the details disclosed in the specification on the strength of diverse concepts and applications without going outside the scope of the invention as disclosed in the claims.

Figure 2:
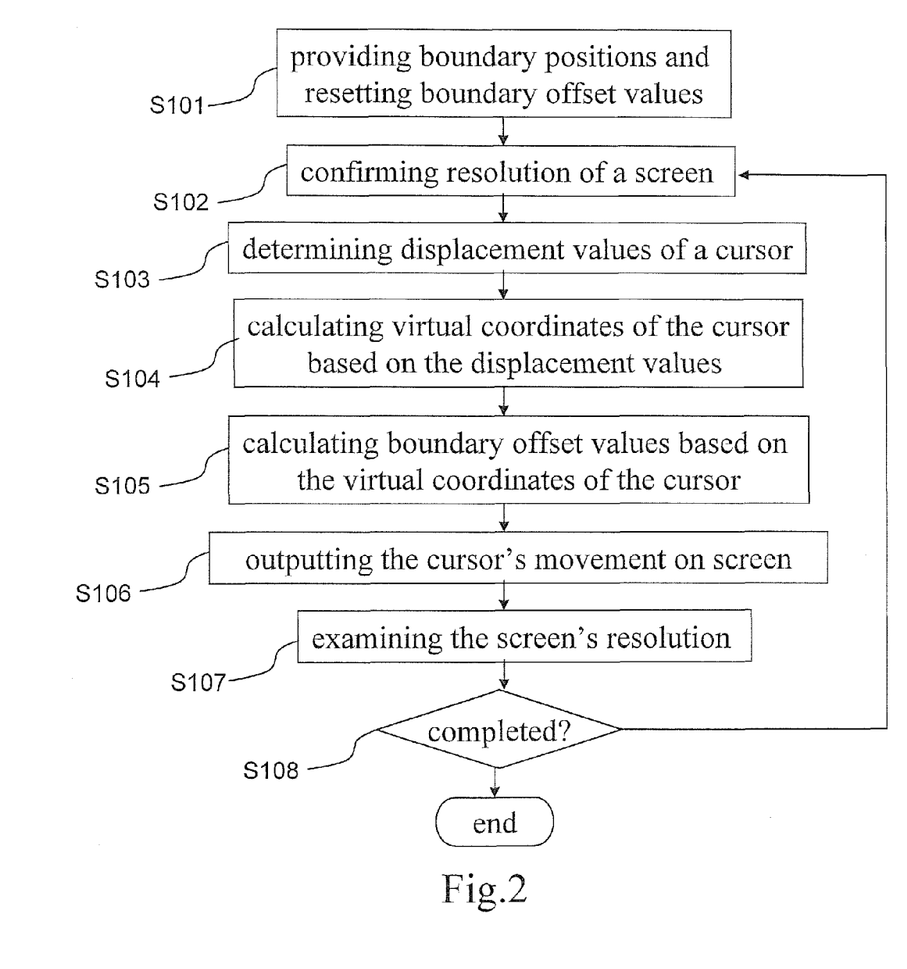
FIG. 2 is a flowchart of a method for calibrating a position offset of a cursor according to a first preferred embodiment of the present invention.

Referring to FIG. 2, there is shown a flowchart of a method of calibrating a position offset of a cursor in a first preferred embodiment according to the present invention. As shown in the drawing, a cursor on a screen is kept under control by compensating and correcting the position offset between a pointing device and the cursor on the screen. The method of calibrating a position offset of the cursor on the screen comprises the steps of:

Step S101: providing boundary positions in a coordinate system and resetting a pair of boundary offset values where the boundary positions in the coordinate system are defined by resolution (including horizontal pixels and vertical pixels) of the screen. The boundary positions are, namely an x-axis boundary position Xb and a y-axis boundary position Yb of the screen. Xb defines a boundary range of the x-axis of the screen, including a leftmost x-axis boundary value Xbl (minimum value) and a rightmost x-axis boundary value Xbr (maximum value). Yb defines a boundary range of the y-axis of the screen, including an uppermost y-axis boundary value Ybu (maximum value) and a lowermost y-axis boundary value Ybl (minimum value). The pair of boundary offset values are, namely an x-axis boundary offset value $\Delta x$ and a y-axis boundary offset value $\Delta y$. $\Delta x$ refers to the excess value of displacement of the cursor from the x-axis boundary position of the screen. $\Delta y$ refers to the excess value of displacement of the cursor from the y-axis boundary position of the screen. The step can further involve performing a position initialization of the cursor so as to reposition the cursor on the screen. In the first preferred embodiment of the present invention, the cursor can be initialized at the center of the screen.

Step S102: confirming whether or not the resolution of the screen has altered by the user so as to update the x-axis boundary position Xb and the y-axis boundary position Yb in the coordinate system of the screen. The step can further involve calculation of the boundary values. When the resolution of the screen is altered by the user, the boundary values for the current boundary positions x-axis Xb and y-axis Yb in the coordinate system are being redefined to a new x-axis boundary position and a new y-axis boundary position, and then position initialization of the cursor is performed later on. In so doing, upon alteration of the resolution of the screen, the cursor position is initialized and repositioned at the center of the screen.

Step S103: determining a pair of displacement values representative of an x-axis displacement value Xd and a y-axis displacement value Yd of the cursor upon receipt of an inertial sensing signal generated from an inertial sensor of the pointing device. It is noted that the displacement values (Xd, Yd) are generated in response to the pointing device moved by the user. According to the present invention, the inertial sensor generates a negative displacement value Xd when the pointing device is being moved leftward along the x-axis, a positive displacement value Xd when being moved rightward along the x-axis, a negative displacement value Yd when being moved downward along the y-axis, and a positive displacement value Yd when being moved upward along the y-axis. The inertial sensor can be a gyroscope, an accelerometer, or a magnetic sensor.

Step S104: calculating a new pair of virtual coordinates (x', y') of the cursor according to the x-axis displacement value Xd and the y-axis displacement value Yd, where x'=current x-axis virtual position x of the cursor+Xd; and y'=current y-axis virtual position y of the cursor+Yd;

Step S105: calculating a new pair of boundary offset values ($\Delta x$, $\Delta y$) of the cursor based on the new pair of virtual coordinates (x', y') of the cursor so as to determine whether or not (x', y') fall within the boundaries (Xb, Yb) of the coordinate system on the screen. The determination for ($\Delta x$, $\Delta y$) is evaluated against the following criteria:

(1) the x-axis boundary offset value $\Delta x$ is set to zero if the new virtual coordinates x' of the cursor fall within the x-axis boundary positions Xb (Xbl, Xbr) after the cursor is moved by the x-axis displacement value Xd (2) the x-axis boundary offset value $\Delta x$ is calculate and recorded if the cursor falls outside the x-axis boundary positions Xb (Xbl, Xbr) in the coordinate system after the cursor is moved by the x-axis displacement value Xd, where $\Delta x = x' - Xb$;

(3) the y-axis boundary offset value $\Delta y$ is reset (e.g. $\Delta y$ is set to zero) if the new virtual coordinates y' of the cursor fall within the y-axis boundary positions Yb (Ybl, Ybu) after the cursor is moved by the y-axis displacement value Yd;

(4) the y-axis boundary offset value $\Delta y$ is calculated and recorded if the cursor falls outside the boundary positions Yb (Ybl, Ybu) in the coordinate system after the cursor is moved by the x-axis displacement value Xd, where $\Delta y = y' - Yb$.

Step S106: outputting the cursor's movement on the screen according to the following criteria:

(1) given $\Delta x = \Delta y = 0$, converting the new pair of virtual coordinates (x', y') of the cursor into real coordinates (x, y), where x is set to x', and y is set to y', and thus the cursor is moved to a new position of the screen corresponding to the real coordinates (x, y);

(2) given $\Delta x \neq 0$ and $\Delta y = 0$, converting the new pair of virtual coordinates (x', y') of the cursor into real coordinates (x, y), where x is set to Xb, y is set to y', and thus the cursor is moved to a new position of the screen corresponding to the real coordinates (x, y);

(3) given $\Delta x = 0$ and $\Delta y \neq 0$, converting the new pair of virtual coordinates (x', y') of the cursor into real coordinates (x, y), where x is set to x', y is set to Yb, and thus the cursor is moved to a new position of the screen corresponding to the real coordinates (x, y); and (4) given $\Delta x \neq 0$ and $\Delta y \neq 0$, converting the new pair of virtual coordinates (x', y') of the cursor into real coordinates (x, y), where x is set to Xbr, and y is set to Ybl, and thus the cursor is moved to a new position of the screen corresponding to the real coordinates (x, y).

Step S107: examining the screen's resolution, so as to allow alteration of the resolution of the screen when the pair of Δx and Δy equal zero.

Step S108: ending the method, or returning to the step S102.

Figure 3:
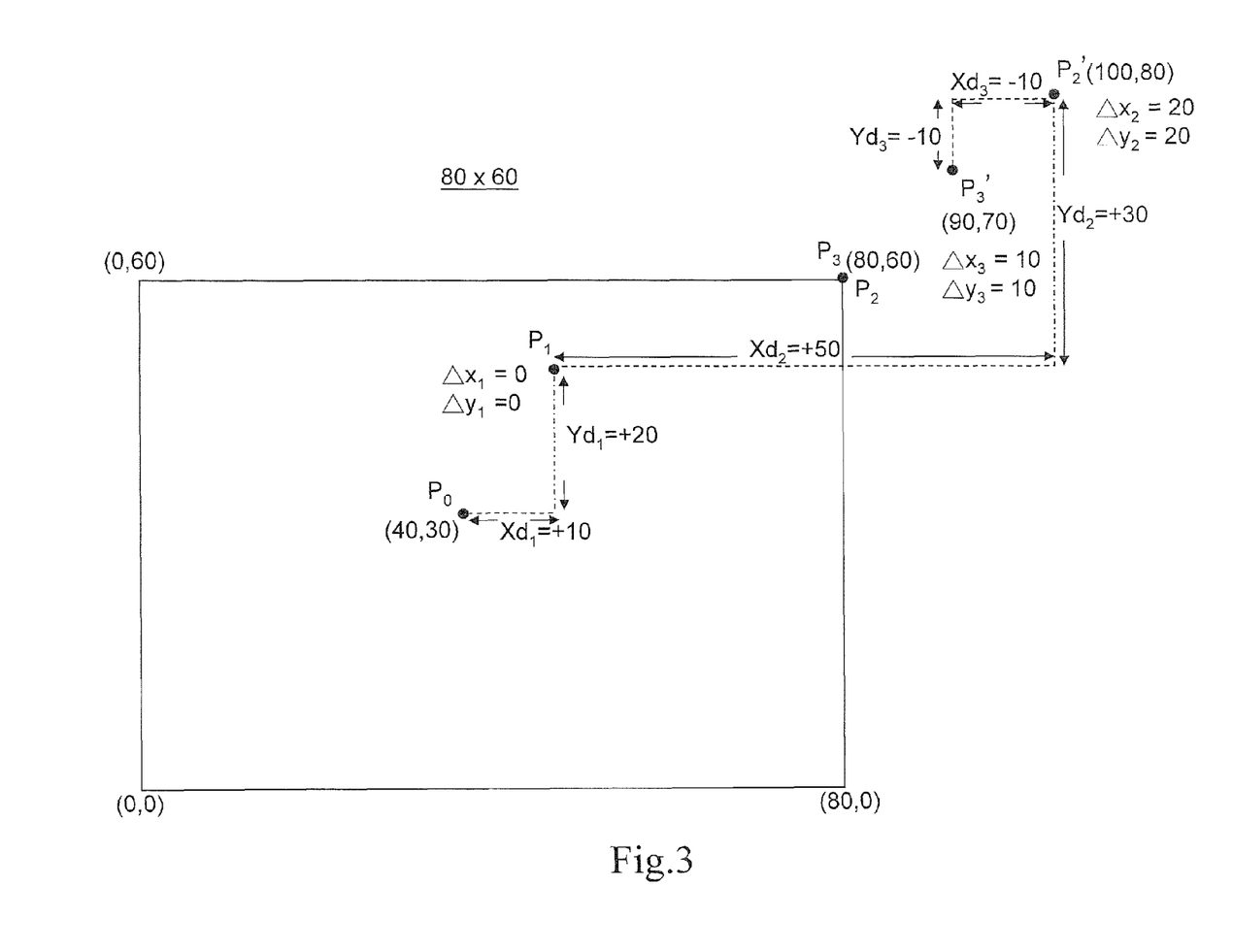
FIG. 3 is a diagram illustrating a moving trace of a cursor according to a first preferred embodiment of the present invention.

Referring to FIG. 3, there is shown a coordinate plot of a cursor on a screen. Generally, the resolution of the screen can be 800×600, 1024×600, 1024×720, 1024×768, and 1280×800. For the sake of explanation, the resolution is set to 80×60. The boundary positions and related parameters are initially set as follows:

leftmost x-axis boundary value Xbl of the screen=0,
rightmost x-axis boundary value Xbr of the screen=80
lowermost y-axis boundary value Ybl of the screen=0,
uppermost y-axis boundary value Ybu of the screen=60,
boundary offset value along x-axis $^\Delta$x=0, and
boundary offset value along y-axis $^\Delta$y=0

In the first preferred embodiment, a software program provided by the present invention executes position initialization of the cursor, so as for the cursor to be positioned at the center of the screen, that is, coordinates $P_0(x_0,y_0)$=(40,30).

Afterward, with the pointing device being moved from the origin, that is, position $P_0$(40,30), to the first position $P_1$, the inertial sensor of the pointing device sends a displacement signal to the software program whereby the displacement signal is converted into corresponding displacement values ($Xd_1$=+10, $Yd_1$=+20) respectively along the x-axis and the y-axis.

The software program generates the first virtual coordinates $P_1'(x_1', y_1')$ corresponding to the first position $P_1$ based on the displacement values, where $$P_1'(x_1', y_1') = (x_0 + Xd_1, y_0 + Yd_1)$$
$$= (40 + 10, 30 + 20)$$
$$= (50, 50)$$

Afterward, the software program determines whether the first virtual coordinates $P_1'$ fall within the coordinate system of the screen; in other words, the software program determines whether the cursor falls within the screen by making reference to a pair of boundary offset values of the first virtual coordinates $P_1'$. In this case, $x_1'$ falls between the leftmost x-axis boundary value (Xbl=0) and the rightmost x-axis boundary value (Xbr=80), and $y_1'$ falls between the lowermost y-axis boundary value (Ybl=0) and the uppermost y-axis boundary value (Ybu=60). Hence, the pair of boundary offset values ($\Delta x_1, \Delta y_1$) of the first virtual coordinates $P_1'$ are set as follows:

x-axis boundary offset value $\Delta x_1$=0;
y-axis boundary offset value $\Delta y_1$=0.

In other words, since $\Delta x_1 = \Delta y_1 = 0$, the first virtual coordinates $P_1'$ of the pointing device certainly falls within the screen; meanwhile, the virtual first coordinates $P_1'(x_1', y_1')$ is then converted into real coordinates $P_1(x_1, y_1)$ based on the criterion i of Step S106 and directly sent to the screen, thereby moving the cursor to the new coordinates $P_1(x_1, y_1)$, that is, $$(50,50) => P_1'(x_1',y_1') => P_1(x_1,y_1);$$

Therefore, the cursor on the screen will move from the origin $P_0$(40, 30) to the position $P_1$(50, 50).

In the aforesaid embodiment, with the pointing device being moved to the second position $P_2$, the inertial sensor of the pointing device sends a displacement signal to the software program whereby the displacement signal is converted into corresponding displacement values ($Xd_2$=+50, $Yd_2$=+30) along the x-axis and the y-axis.

The software program generates the second virtual coordinates $P_2'(x_2', y_2')$ corresponding to the second position $P_2$, where $$P_2'(x_2', y_2') = (x_1 + Xd_2, y_1' + Yd_2)$$
$$= (50 + 50, 50 + 30)$$
$$= (100, 80).$$

Meanwhile, the software program calculates the boundary offset values of the second virtual coordinates $P_2'$ as follows:
x-axis boundary offset value $\Delta x_2$=100−Xbr=100−80=20;
y-axis boundary offset value $\Delta y_2$=80−Ybu=80−60=20.

Since neither $\Delta x_2$ nor $\Delta y_2$ equals zero, and thus the second virtual coordinates $P_2'$ is obviously beyond the scope of x-axis boundary and the y-axis boundary; hence, $P_2'(x_2', y_2')$ is converted into real coordinates $P_2(x_2, y_2)$ in the screen based on the criterion iv of Step S106, where $x_2$ is set to Xbr, $y_2$ is set to Ybl.

$$P_2'(x_2',y_2') => P_2'(100,80) => P_2(x_2,y_2) = P_2(80,60)$$

Hence, the cursor will move from the physical position $P_1$(50, 50) to the physical position $P_2$(80, 60) in the screen.

In the aforesaid embodiment, with the pointing device being moved to the third position $P_3$, the inertial sensor of the pointing device sends a displacement signal to a software program whereby the displacement signal is converted into corresponding displacement values along the x-axis and the y-axis: x-axis displacement value $Xd_3$=−10, and y-axis displacement value $Yd_3$=−10.

Then, the software program generates a third virtual coordinates $P_3'(x_3', y_3')$ corresponding to the third position $P_3$ based on the previous virtual coordinates (i.e. the second virtual coordinates $P_2'$):

$$P_3'(x_3', y_3') = (x_2' + Xd_3, y_2' + Yd_3)$$
$$= (100 - 10, 80 - 10)$$
$$= (90, 70).$$

Meanwhile, the software program calculates the boundary offset values of the third virtual coordinates $P_3'$ as follows:
x-axis boundary offset value $\Delta x_3$=90−Xbr=90−80=10;
y-axis boundary offset value $\Delta y_3$=70−Ybu=70−60=10.

Since $\Delta x_3 \neq 0$ and $\Delta y_3 \neq 0$, it is obvious that the third virtual coordinates $P_3'$ go beyond the x-axis boundary and the y-axis boundary. Hence, $P_3'(x_3', y_3')$ is converted into real coordinates $P_3(x_3, y_3)$ in the screen based on the criterion iv of Step S106, where $x_3$ is set to Xbr, $y_3$ is set to Ybl.

$$P_3'(x_3',y_3') = P_3'(90,70) => P_3(x_3,y_3) = P_3(80,60)$$

Therefore, the cursor moves to the third position $P_3$ (80, 60), and the third position $P_3$ (80, 60) is the same as the second position $P_2$ (80, 60); in other words, although the pointing device moves from the second position to the third position, the position of the cursor in the screen does not vary. Furthermore, the boundary offset values ($\Delta x, \Delta y$) can be positive or negative. A point to note is that the user is allowed to change the resolution of the screen only when the cursor falls within the x-axis boundary and the y-axis boundary of the screen; in other words, the system will permit the user to change the resolution of the screen, only if the boundary offset values Δx, Δy equal zero. Upon alteration of the resolution of the screen, the system performs initialization of a cursor position so as for the cursor position to be initialized and displayed at the center of the screen.

In the aforesaid embodiment, where the pointing device moves from the $(N-1)^{th}$ position to the $N^{th}$ position, the following take place:

(1) The program calculates the $N^{th}$ virtual coordinates $P_N'$, and $P_N'$ is calculated by the following equation:

$$P_N'(x_N',y_N')=(x_{N-1}'+Xd_N, y_{N-1}'+Yd_N) \quad (A)$$

where
$x_N'$=the $N^{th}$ virtual position along x-axis,
$y_N'$=the $N^{th}$ virtual position along y-axis,
$x_{N-1}'$=the $N-1^{th}$ virtual position along x-axis,
$y_N'$=the $N-1^{th}$ virtual position along y-axis,
$Xd_N$=the $N^{th}$ displacement value along x-axis, and
$Yd_N$=the $N^{th}$ displacement value along y-axis, (2) The program calculates the boundary offset value $\Delta_N$ of the $N^{th}$ virtual coordinates $P_N'$, and $\Delta_N$ is calculated by the following equation:

$$\Delta x_N = X_N' - Xbr \quad (B)$$

$$\Delta y_N = y_N' - Ybu \quad (C)$$

where
$\Delta x_N$=the $N^{th}$ boundary offset value along x-axis,
$\Delta y_N$=the $N^{th}$ boundary offset value along y-axis,
Xb=boundary value along x-axis=the leftmost x-axis boundary value Xbl or the rightmost x-axis boundary value Xbr,
Yb=boundary value along y-axis=the lowermost y-axis boundary value Ybl or the uppermost y-axis boundary value Ybu, (3) The program calculates the $N^{th}$ real coordinates $P_N$, and $P_N$ is calculated by the following equation:

$$P_N(x_N, y_N) \begin{cases} x_N = x_N', y_N = y_N', \text{ when } \Delta x_N = 0 \text{ and } \Delta y_N = 0, & (D) \\ x_N = Xb, y_N = y_N', \text{ when } \Delta x_N \neq 0 \text{ and } \Delta y_N = 0, & (E) \\ x_N = x_N', y_N = Yb, \text{ when } \Delta x_N = 0 \text{ and } \Delta y_N \neq 0, & (F) \\ x_N = Xb, y_N = Yb, \text{ when } \Delta x_N \neq 0 \text{ and } \Delta y_N \neq 0; & (G) \end{cases}$$

Figure 4:
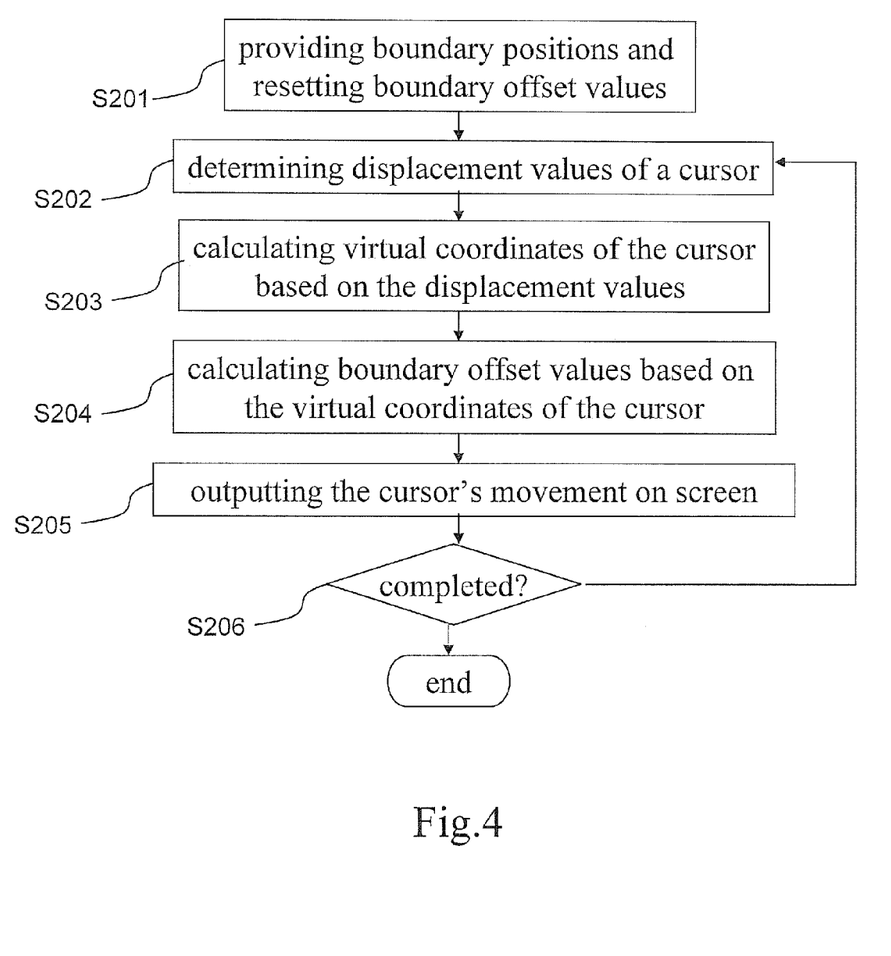
FIG. 4 is a flowchart of a method for calibrating a position offset of a cursor according to a second preferred embodiment of the present invention.

Referring to FIG. 4, there is shown a flowchart of another method of calibration a position offset of a cursor in a second preferred embodiment according to the present invention. As shown in the drawing, a cursor on a screen is kept under control to avoid from generating displacement offset between it and pointing device. The method of calibrating a position offset of a cursor comprises the steps of:

Step S201: providing boundary positions in a coordinate system and resetting a pair of boundary offset values where the boundary positions in the coordinate system are defined by resolution (including horizontal pixels and vertical pixels) of the screen. The boundary positions are, namely an x-axis boundary position Xb and a y-axis boundary position Yb of the screen. Xb defines a boundary range of the x-axis of the screen, including a leftmost x-axis boundary value Xbl (minimum value) and a rightmost x-axis boundary value Xbr (maximum value). Yb defines a boundary range of the y-axis of the screen, including an uppermost y-axis boundary value Ybu (maximum value) and a lowermost y-axis boundary value Ybl (minimum value). The pair of boundary offset values are, namely an x-axis boundary offset value Δx and a y-axis boundary offset value Δy. Δx refers to the excess value of displacement of the cursor from the x-axis boundary position of the screen. Δy refers to the excess value of displacement of the cursor from the y-axis boundary position of the screen. The step can further involve performing a position initialization of the cursor so as to reposition the cursor on the screen. In the first preferred embodiment of the present invention, the cursor can be initialized at the center of the screen.

Step S202: determining a pair of displacement values representative of an x-axis displacement value Xd and a y-axis displacement value Yd of the cursor upon receipt of an inertial sensing signal generated from an inertial sensor of the pointing device. It is noted that the displacement values (Xd, Yd) are generated in response to the pointing device moved by the user. According to the present invention, the inertial sensor generates a negative displacement value Xd when the pointing device is being moved leftward along the x-axis, a positive displacement value Xd when being moved rightward along the x-axis, a negative displacement value Yd when being moved downward along the y-axis, and a positive displacement value Yd when being moved upward along the y-axis. The inertial sensor can be a gyroscope, an accelerometer, or a magnetic sensor.

Step S203: calculating a new pair of virtual coordinates (x', y') of the cursor according to the x-axis displacement value Xd and the y-axis displacement value Yd, where x'=current x-axis virtual position x of the cursor+Xd; and
y'=current y-axis virtual position y of the cursor+Yd;

Step S204: calculating a new pair of boundary offset values (Δx, Δy) of the cursor based on the new pair of virtual coordinates (x', y') of the cursor so as to determine whether or not (x', y') fall within the boundaries (Xb, Yb) of the coordinate system on the screen. The determination for (Δx, Δy) is evaluated against the following criteria:

(1) the x-axis boundary offset value Δx is set to zero if the new virtual coordinates x' of the cursor fall within the x-axis boundary positions Xb (Xbl, Xbr) after the cursor is moved by the x-axis displacement value Xd (2) the x-axis boundary offset value Δx is calculate and recorded if the cursor falls outside the x-axis boundary positions Xb (Xbl, Xbr) in the coordinate system after the cursor is moved by the x-axis displacement value Xd, where Δx=x'−Xb;

(3) the y-axis boundary offset value Δy is reset (e.g. Δy is set to zero) if the new virtual coordinates y' of the cursor fall within the y-axis boundary positions Yb (Ybl, Ybu) after the cursor is moved by the y-axis displacement value Yd;

(4) the y-axis boundary offset value Δy is calculated and recorded if the cursor falls outside the boundary positions Yb (Ybl, Ybu) in the coordinate system after the cursor is moved by the x-axis displacement value Xd, where Δy=y'−Yb.

Step S205: outputting the cursor's movement on the screen according to the following criteria:

(1) given Δx=Δy=0, converting the new pair of virtual coordinates (x', y') of the cursor into real coordinates (x, y), where x is set to x', and y is set to y', and thus the cursor is moved to a new position of the screen corresponding to the real coordinates (x, y);

(2) given Δx≠0 and Δy=0, converting the new pair of virtual coordinates (x', y') of the cursor into real coordinates (x, y), where x is set to Xb, y is set to y', and thus the cursor is moved to a new position of the screen corresponding to the real coordinates (x, y);

(3) given Δx=0 and Δy≠0, converting the new pair of virtual coordinates (x', y') of the cursor into real coordinates (x, y), where x is set to x', y is set to Yb, and thus the cursor is moved to a new position of the screen corresponding to the real coordinates (x, y); and (4) given Δx≠0 and Δy≠0, converting the new pair of virtual coordinates (x', y') of the cursor into real coordinates (x, y), where x is set to Xbr, and y is set to Ybl, and thus the cursor is moved to a new position of the screen corresponding to the real coordinates (x, y).

Step S206: ending the method, or returning to the step S202.

According to the present invention, the second preferred embodiment teaches the same correction algorithm as the first preferred embodiment. However, the second preferred embodiment differs from the first preferred embodiment in that the second preferred embodiment dispenses with retrieving the resolution of the screen, changing its boundary values, and resetting boundary offset values. The Δx value and Δy value are recorded by the software program in order to record position offset values (that is, the extent to which the pointing device goes beyond the boundaries of display on the screen), effectively track the coordinates of the pointing device according to the virtual coordinates recorded, and ultimately compensate for and correct a position offset between the pointing device and the cursor, so as for the user to greatly reduce the hassle of manually operating the pointing device for controlling cursor movement and thereby operate the cursor on the screen at will.

In the aforesaid preferred embodiments, upon detection by the software program of alteration of screen resolution, it is necessary to read updated screen boundary values again, reset boundary offset values, optionally calibrate the cursor so as to reposition the cursor at the center of the screen and thereby facilitate the user's operation, and optionally calibrate the position offset between the cursor and the pointing device.

What is claimed is:

1. A method of calibrating a position offset of a cursor on a screen, comprising:
   (a) providing boundary positions in a coordinate system and resetting a pair of boundary offset values, wherein the boundary positions in the coordinate system are defined by resolution of the screen, the boundary positions indicating an x-axis boundary position Xb and a y-axis boundary position Yb, and the pair of boundary offset values indicating an x-axis boundary offset value Δx and a y-axis boundary offset value Δy;
   (b) confirming whether or not the resolution of the screen has changed so as to update the x-axis boundary position Xb and the y-axis boundary position Yb in the coordinate system;
   (c) determining a pair of displacement values representative of an x-axis displacement value Xd and a y-axis displacement value Yd of the cursor upon receipt of an inertial sensing signal from an inertial sensor;
   (d) calculating a new pair of virtual coordinates (x', y') of the cursor according to the x-axis displacement value Xd and the y-axis displacement value Yd, where x'=current x-axis virtual position of the cursor+Xd, and y'=current y-axis virtual position of the cursor+Yd;
   (e) calculating a new pair of boundary offset values of the cursor based on the new pair of virtual coordinates (x', y') of the cursor so as to:
      (i) reset the x-axis boundary offset value Δx if the cursor falls within the x-axis boundary position Xb in the coordinate system after moving the x-axis displacement value Xd;
      (ii) calculate and record the x-axis boundary offset value Δx if the cursor falls outside the x-axis boundary position Xb in the coordinate system after moving the x-axis displacement value Xd, where Δx=x'−Xb;
      (iii) reset the y-axis boundary offset value Δy if the cursor falls within the y-axis boundary position Yb in the coordinate system after moving the y-axis displacement value Yd; and
      (iv) calculate and record the y-axis boundary offset value Δy if the cursor falls outside the y-axis boundary position Yb in the coordinate system after moving the y-axis displacement value Yd, where Δy=y'−Yb;
   (f) outputting the cursor's movement on the screen according to the following criteria:
      (i) given Δx=Δy=0, converting the new pair of virtual coordinates (x', y') of the cursor into real coordinates (x, y), where x=x', y=y', and moving the cursor to a new position of the screen corresponding to the real coordinates (x, y);
      (ii) given Δx≠0 and Δy=0, converting the new pair of virtual coordinates (x', y') of the cursor into real coordinates (x, y), where x=Xb, y=y', and moving the cursor to a new position of the screen corresponding to the real coordinates (x, y);
      (iii) given Δx=0 and Δy≠0, converting the new pair of virtual coordinates (x', y') of the cursor into real coordinates (x, y), where x=x', y=Yb, and moving the cursor to a new position of the screen corresponding to the real coordinates (x, y); and
      (iv) given Δx≠0 and Δy≠0, converting the new pair of virtual coordinates (x', y') of the cursor into real coordinates (x, y), moving the cursor' to a new position of the screen corresponding to the real coordinates (x, y), where x=Xb, y=Yb;
   (g) examining the screen's resolution, so as to allow alteration of the resolution of the screen when the pair of the x-axis boundary offset value Δx and the y-axis boundary offset value Δy equal zero; and
   (h) ending the method, or returning to the step (b).

2. The method of calibrating a position offset according to claim 1, wherein the step (b) is further performed to calculate new boundary positions when the alteration of the resolution of the screen is performed, the new boundary positions being defined by a new x-axis boundary position Xb and a new y-axis boundary position Yb.

3. The method of calibrating a position offset according to claim 1, wherein the step (a) is further performed a position initialization of the cursor so as to reposition the cursor on the screen.

4. The method of calibrating a position offset according to claim 3, wherein the position initialization of the cursor is to display the cursor at a center of the screen.

5. The method of calibrating a position offset according to claim 1, wherein the step (b) is further performed a position initialization of the cursor to reposition the cursor on the screen.

6. The method of calibrating a position offset according to claim 5, wherein the position initialization of the cursor is to display the cursor at a center of the screen.

7. The method of calibrating a position offset according to claim 1, wherein the x-axis boundary position Xb further includes a leftmost x-axis boundary value Xbl and a rightmost x-axis boundary value Xbr.

8. The method of calibrating a position offset according to claim 1, wherein the y-axis boundary position Yb further includes a lowermost y-axis boundary value Ybl and an uppermost boundary value Ybu.

9. The method of calibrating a position offset according to claim 1, wherein the inertial sensor is a set comprising a gyroscope, and accelerometer, and/or a magnetic sensor.

10. A method of calibrating a position offset of a cursor on a screen, comprising:
   (a) providing boundary positions in a coordinate system and resetting a pair of boundary offset values, wherein the boundary positions in the coordinate system are defined by resolution of the screen, the boundary positions indicating an x-axis boundary position Xb and a y-axis boundary position Yb, and the pair of boundary offset values indicating an x-axis boundary offset value $\Delta x$ and a y-axis boundary offset value $\Delta y$;
   (b) determining a pair of displacement values representative of an x-axis displacement value Xd and a y-axis displacement value Yd of the cursor upon receipt of an inertial sensing signal from an inertial sensor;
   (c) calculating a new pair of virtual coordinates (x', y') of the cursor according to the x-axis displacement value Xd and the y-axis displacement value Yd, where x'=current x-axis virtual position of the cursor+Xd, and y'=current y-axis virtual position of the cursor+Yd;
   (d) calculating a new pair of boundary offset values of the cursor based on the new pair of virtual coordinates (x', y') of the cursor so as to:
      (i) reset the x-axis boundary offset value $\Delta x$ if the cursor falls within the x-axis boundary position Xb in the coordinate system after moving the x-axis displacement value Xd;
      (ii) calculate and record the x-axis boundary offset value $\Delta x$ if the cursor falls outside the x-axis boundary position Xb in the coordinate system after moving the x-axis displacement value Xd, where $\Delta x=x'-Xb$;
      (iii) reset the y-axis boundary offset value $\Delta y$ if the cursor falls within the y-axis boundary position Yb in the coordinate system after moving the y-axis displacement value Yd; and
      (iv) calculate and record the y-axis boundary offset value $\Delta y$ if the cursor falls outside the y-axis boundary position Yb in the coordinate system after moving the y-axis displacement value Yd, where $\Delta y=y'-Yb$;
   (e) outputting cursor movement on the screen according to criteria as follows:
      (i) given $\Delta x=\Delta y=0$, converting the new pair of virtual coordinates (x', y') of the cursor into real coordinates (x, y), where x=x', y=y', and moving the cursor to a new position of the screen corresponding to the real coordinates (x, y);
      (ii) given $\Delta x \neq 0$ and $\Delta y=0$, converting the new pair of virtual coordinates (x', y') of the cursor into real coordinates (x, y), where x=Xb, y=y', and moving the cursor to a new position of the screen corresponding to the real coordinates (x, y);
      (iii) given $\Delta x=0$ and $\Delta y \neq 0$, converting the new pair of virtual coordinates (x', y') of the cursor into real coordinates (x, y), where x=x', y=Yb, and moving the cursor to a new position of the screen corresponding to the real coordinates (x, y); and
      (iv) given $\Delta x \neq 0$ and $\Delta y \neq 0$, converting the new pair of virtual coordinates (x', y') of the cursor into real coordinates (x, y), moving the cursor' to a new position of the screen corresponding to the real coordinates (x, y), where x=Xb, y=Yb;
   (f) ending the method, or returning to step (b).

11. The method of calibrating a position offset according to claim 10, wherein step (a) is further performed a position initialization of the cursor so as to reposition the cursor on the screen.

12. The method of calibrating a position offset according to claim 11, wherein the position initialization of the cursor is to display the cursor at a center of the screen.

13. The method of calibrating a position offset according to claim 10, wherein the x-axis boundary position Xb further includes a leftmost x-axis boundary value Xbl and a rightmost x-axis boundary value Xbr.

14. The method of calibrating a position offset according to claim 10, wherein the y-axis boundary position Yb further includes a lowermost y-axis boundary value Ybl and an uppermost boundary value Ybu.

15. The method of calibrating a position offset according to claim 10, wherein the inertial sensor is a set comprising a gyroscope, and accelerometer, and/or a magnetic sensor.

* * * * *